United States Patent
Gui et al.

(10) Patent No.: US 10,900,899 B1
(45) Date of Patent: Jan. 26, 2021

(54) METHOD FOR PREPARING RATIOMETRIC FLUORESCENT PROBE FOR CYMOXANIL BASED ON DOUBLE-EMISSION QUANTUN DOT-SILVER NANOPARTICLE COMPLEX

(71) Applicant: Qingdao University, Qingdao (CN)

(72) Inventors: Rijun Gui, Qingdao (CN); Xiaowen Jiang, Qingdao (CN); Hui Jin, Qingdao (CN); Yujiao Sun, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 0 days.

(21) Appl. No.: 16/614,378

(22) PCT Filed: Mar. 14, 2019

(86) PCT No.: PCT/CN2019/078075
§ 371 (c)(1),
(2) Date: May 7, 2020

(87) PCT Pub. No.: WO2020/087835
PCT Pub. Date: May 7, 2020

(30) Foreign Application Priority Data

Nov. 2, 2018 (CN) .......................... 2018 1 1298081

(51) Int. Cl.
*G01N 21/64* (2006.01)
*A01N 47/40* (2006.01)
(Continued)

(52) U.S. Cl.
CPC ........... *G01N 21/643* (2013.01); *A01N 47/40* (2013.01); *C09K 11/025* (2013.01); *C09K 11/58* (2013.01);
(Continued)

(58) Field of Classification Search
CPC .. G01N 21/643; G01N 21/6428; G01N 21/64; G01N 21/63; G01N 21/62;
(Continued)

(56) References Cited

FOREIGN PATENT DOCUMENTS

| CN | 101892043 A | 11/2010 |
| CN | 103808705 A | 5/2014 |

(Continued)

OTHER PUBLICATIONS

Gui, Ratiometric and Time-Resolved Fluorimetry from Quantum Dots Featuring Drug Carriers for Real-Time Monitoring of Drug Release in Situ, Analytical Chemistry, 2014,86,5211-5214. (Year: 2014).*

(Continued)

*Primary Examiner* — Christine T Mui
(74) *Attorney, Agent, or Firm* — Bayramoglu Law Offices LLC

(57) ABSTRACT

A method for preparing a ratiometric fluorescent probe for cymoxanil based on a double-emission quantum dot-silver nanoparticle complex, wherein, the double-emission carbon quantum dots and the silver nanoparticles are prepared, and the inner filter effect occurring between the double-emission carbon quantum dots and the dispersed silver nanoparticles causes the blue fluorescence quenching of the carbon quantum dots. However, the specific binding of cymoxanil to silver nanoparticles causes the silver nanoparticles to accumulate, and then the inner filter effect occurring between the double-emission carbon quantum dots and the dispersed silver nanoparticles causes the green fluorescence quenching of carbon quantum dots. In this regard, the linear relationship between the intensity ratio of two fluorescent emission peaks of carbon quantum dots and the molar concentration of cymoxanil is established, and the ratiometric fluorescent probe for cymoxanil is constructed.

6 Claims, 1 Drawing Sheet

(51) Int. Cl.
*C09K 11/58* (2006.01)
*C09K 11/65* (2006.01)
*C09K 11/02* (2006.01)
*C07K 11/02* (2006.01)
*B82Y 40/00* (2011.01)
*B82Y 20/00* (2011.01)
*B82Y 15/00* (2011.01)

(52) U.S. Cl.
CPC ............... *C09K 11/65* (2013.01); *B82Y 15/00* (2013.01); *B82Y 20/00* (2013.01); *B82Y 40/00* (2013.01); *G01N 2021/6432* (2013.01)

(58) Field of Classification Search
CPC ...... A01N 47/40; A01N 47/00; C07K 11/025; C07K 11/02; C07K 11/00
USPC .......................................................... 436/106
See application file for complete search history.

(56) References Cited

FOREIGN PATENT DOCUMENTS

| | | |
|---|---|---|
| CN | 103901008 A | 7/2014 |
| CN | 107748153 A | 3/2018 |
| CN | 109181690 A | 1/2019 |

OTHER PUBLICATIONS

Jiang, Colorimetric and fluorometric dual-channel ratiometric determination of fungicide cymoxanil based on analyte-induced aggregation of silver nanoparticles and dually emitting carbon dots, Microchimica Acta, 2019, 186:580. (Year: 2019).*

Rashid, Synthesis of Silver Nano Particles (Ag-NPs) and their uses for Quantitative Analysis of Vitamin C Tablets, J. Pharma. Sci, 12(1), Jun. 2013, 29-33. (Year: 2013).*

Lihua Li, Dexiang Feng, Yuzhong Zhang, Simultaneous detection of two tumor markers using silver and gold nanoparticles decorated carbon nanospheres as labels, Analytical Biochemistry, 2016 p. 59-65, 505.

Anne-Claire Martel, Maurice Porthault, Pesticide Residues in Raspberries and Lettuce: Extraction and Comparison of Three Chromatographic Methods; HPLC, HPTLC and GC, J. Liq., Chrom. & Rel. Technol, 2000, 3043-3058, 23.

Matt J. Hengel, and Takayuki Shibamoto, Development of a Gas Chromatographic Method for Fungicide Cymoxanil Analysis in Dried Hops, J. Agric. Food Chem. 2001, 570-573, 49.

Hulya Mercan, Recai Inam, Determination of Cymoxanil Fungicide in Commercial Formulation and Natural Water by Square-wave Stripping Voltammetry, CLEAN—Soil, Air, Water 2010, 558-564, 38 (5-6).

* cited by examiner

METHOD FOR PREPARING RATIOMETRIC FLUORESCENT PROBE FOR CYMOXANIL BASED ON DOUBLE-EMISSION QUANTUN DOT-SILVER NANOPARTICLE COMPLEX

CROSS REFERENCE TO THE RELATED APPLICATIONS

This application is the national phase entry of International Application No. PCT/CN2019/078075, filed on Mar. 14, 2019, which is based upon and claims priority to Chinese Patent Application No. 201811298081.2, filed on Nov. 2, 2018, the entire contents of which are incorporated herein by reference.

TECHNICAL FIELD

The present disclosure belongs to the technical field of preparations of nanomaterials and fluorescent probes, and particularly relates to a method for preparing a ratiometric fluorescent probe for cymoxanil based on a double-emission quantum dot-silver nanoparticle complex, and the probe prepared by the method can be used for efficiently detecting cymoxanil.

BACKGROUND

Cymoxanil is a kind of a low-toxic fungicide having high efficiency, and is widely used in the preservation and storage of vegetables and fruits such as cucumber, grape, tomato, and lychee. Cymoxanil is usually mixed with other pesticides to enhance the efficacy of the pesticides. Vegetables and fruits are consumed daily by humans and provide useful nutritions. Any pesticides that stay in vegetables as a residual pesticide may be harmful to humans. If the amount of residual pesticide in consumed products is small, the pesticide may be processed and degraded by human body resulting in no acute poisoning. However, long-term consumption of unwashed agricultural products with residual pesticides in them, may cause serious danger to human health. Cymoxanil is widely used in fruits and vegetables, and the residue of cymoxanil can easily be detected in the peel of fruits and vegetables. The residual pesticides can be dispersed in water by volatilization, runoff, and leaching. Cymoxanil is also highly toxic to aquatic organisms and has long-term adverse effects on water environment. In the European Union, the maximum residue level of cymoxanil is limited to 0.05 mg/kg, Excessive consumption of cymoxanil by human body will cause diminishing of body's immunity, puts additional stress on liver, may cause gastrointestinal diseases, and may even cause and trigger cancer in severe cases. Excessive amount of cymoxanil consumption may cause a series of safety issues. Therefore, a quantitative detection of cymoxanil is an important matter.

Anne-Claire et al. used three chromatographic methods to detect cymoxanil (Pesticide residues in raspberries and lettuce: Extraction and comparision of three chromatographic methods: HPLC, HPTLC and GC, Anne-Claire Martel, Maurice Porthault, J. LIQ., CHROM. & REL. TECHNOL., 2000, 23, 3043-3058). Matt J. et al. used a gas chromatographic method to detect cymoxanil (Development of a Gas Chromatographic Method for Fungicide Cymoxanil Analysis in Dried Hops, Matt J. Hengel, Takayuki Shibamoto, J. Agric. Food Chem., 2001, 49, 570-573), Hulya Mercan et al. used stripping voltammetry to detect the content of cymoxanil in pesticides (Determination of Cymoxanil Fungicide in Commercial Formulation and Natural Water by Square-wave Stripping Voltammetry, Hulya Mercan, Recai ham, Clean-Soil, Air, Water 2010, 38, 558-564). Among the current methods for detecting cymoxanil, chromatography is mainly used, such as high performance liquid chromatography (HPLC), high performance liquid chromatography-mass spectrometry (HPLC-MS) and gas chromatography (GC). Other methods include ultrasonic-assisted extraction, microwave-assisted extraction, and Fourier Transform infrared spectroscopy (FTIR). When chromatography is used, the detection boundary is poor, and the spectral lines of many samples may overlap and specific identification cannot be achieved, Other methods also have some defects, such as requiring expensive instruments, having high cost, pretreating complex samples, and requiring difficult operation.

Fluorescence analysis is an instrumental method for substance identification and content determination based on the position and intensity of fluorescence lines of a specific substance. The method has many advantages such as having high sensitivity, high selectivity, and simple operation. In pesticide detection, the fluorescence analysis has the advantages of having high analytical sensitivity; good selectivity, and simple operation. In current reports on detecting pesticide by fluorescence, the interaction between fluorescent quantum dots and pesticides causes change in the fluorescent intensity of quantum dots, Where the change in the fluorescent intensity is used to detect the pesticide. This method relies on a single fluorescence signal output mode. The method for detecting single fluorescence signal is susceptible to the influence of background fluorescence, reagent, system and environmental conditions, thereby resulting in instability of the measurement results. Compared with the prior art, the intensity ratio of the signal in the present process is obtained by the dual signal ratio processing and can be self-calibrated, thereby effectively eliminating the interference of itself and background signals, and improving the accuracy and reliability of the detection results. In this regard, the present disclosure designs a method for preparing a novel ratiometric fluorescent probe based on a double-emission quantum dot-silver nanoparticle complex for efficiently detecting cymoxanil. So far, detecting cymoxanil by using a ratiometric fluorescent probe or the ratiometric fluorescent probe based on the double-emission quantum dot-silver nanoparticle complex has not yet been reported in domestic and foreign literatures and patents.

SUMMARY

The objective of the present disclosure is to overcome the deficiencies of the prior art described above, and to provide a method for preparing a ratiometric fluorescent probe for cymoxanil based on a double-emission quantum dot-silver nanoparticle complex, where the method is simple, low-cost and has high-sensitivity.

In order to achieve the aforementioned objective, according to the present disclosure, a process of preparing a ratiometric fluorescent probe for cymoxanil based on the double-emission carbon quantum dot-silver nanoparticle complex includes the following steps:

(1) Preparation of silver nanoparticles: preparing 100 mmol/L of silver nitrate solution, 250 mmol/L of trisodium citrate solution and 5 mmol/L of sodium borohydride solution, adding the prepared silver nitrate solution and trisodium citrate solution to 100 mL, of double-distilled water, under magnetic stirring, adding 1 mL, of sodium borohydride solution, and then reacting under stirring for 30 minutes to obtain a yellow solution; wherein the yellow solution is centrifuged, washed by ethanol and vacuum dried at the low temperature to obtain the silver nanoparticles, and the resulting silver nanoparticles are stored in a dark place at 4° C. for use in subsequent experiments;

(2) Preparation of carbon quantum dots: adding 54.5 mg of 3-aminophenol and 32.0 mg of oxalic acid to 50 mL of double-distilled water, stirring magnetically to mix well, and then heating and reacting in a water bath to obtain a clear homogeneous mixture. The homogeneous mixture is transferred to a high-pressure reactor and heated at 180° C. for 12 hours. After the end of the reaction, the product solution is cooled to the room temperature and filtered by a 0.22 μm filter membrane to remove large particle impurities. The filtrate is subjected to a rotary evaporation to remove water, washed by acetone and ethanol alternately for two times, and then freeze-dried until the water is completely removed. The resulting carbon quantum dot powder is stored at the room temperature for further use;

(3) Formulating the silver nanoparticles prepared in step (1) into a silver nanoparticle aqueous solution for reacting at the room temperature and under slow magnetic stirring for 10 minutes to form a homogeneous silver nanoparticle solution;

(4) Formulating the carbon quantum dots prepared in step (2) into a carbon quantum dot aqueous solution, and adding the silver nanoparticle solution at the room temperature and under slow magnetic stirring to obtain carbon quantum dot solutions having different concentrations of silver nanoparticles, and then reacting under magnetic stirring for 20 minutes to form a homogeneous solution; wherein fluorescent emission spectra of carbon quantum dots corresponding to different concentrations of silver nanoparticles are measured respectively, and fitting a linear relationship between the intensity ratio of two fluorescent emission peaks of carbon quantum dots and the concentration of silver nanoparticles;

(5) Adding cymoxanil to the carbon quantum dot aqueous solution containing silver nanoparticles prepared in step (4), and then reacting under magnetic stirring for 20 minutes to form a homogeneous solution; wherein the fluorescent emission spectra of carbon quantum dots in the homogeneous solution corresponding to different molar concentrations of cymoxanil are measured, and the linear relationship between the intensity ratio of two fluorescent emission peaks of carbon quantum dots and the molar concentration of cymoxanil is fitted, and the ratiometric fluorescent probe for cymoxanil is constructed.

According to the present disclosure, in step (1), the size of the silver nanoparticles is 5-20 nm, the amount of the silver nitrate is 100-500 μL, and the amount of the trisodium citrate is 100-500 μL; in step (2), the size of the carbon quantum dots is 1-10 nm; in step (3), the mass concentration of the silver nanoparticles is 0.1-1.0 μg/mL; in step (4), the mass concentration of the carbon quantum dot aqueous solution is 0.1-1.0 μg/mL, the mass concentration of the silver nanoparticles is 0.01-0.2 μg/mL, the mass concentration ratio of the carbon quantum dots to the silver nanoparticles is 1:5-5:1; in step (5), the mass concentration ratio of the carbon quantum dot aqueous solution containing the silver nanoparticles to the cymoxanil is 1:5-5:1, the linear detection range of the molar concentration of cymoxanil is 0.01-1.0 μmol/L, and the detection limit of the molar concentration of cymoxanil is 0.01-0.5 μmol/L.

Compared with the prior art, in the present disclosure, the inner filter effect occurs between the double-emission carbon quantum dots and the dispersed silver nanoparticles, which causes the blue fluorescence quenching of the carbon quantum dots. However, the specific binding of the cymoxanil to the silver nanoparticles causes the silver nanoparticles to accumulate, and then the inner filter effect occurring between the double-emission carbon quantum dots and the dispersed silver nanoparticles causes the green fluorescence quenching of carbon quantum dots. In this regard, the linear relationship between the intensity ratio of the two fluorescent emission peaks of carbon quantum dots and the molar concentration of cymoxanil is established, and the ratiometric fluorescent probe for cymoxanil is constructed. The probe has simple preparation process, low cost and high product sensitivity, and can be developed into a novel ratiometric fluorescent probe for cymoxanil, which is suitable for efficiently detecting cymoxanil in pesticides.

DETAILED DESCRIPTION OF THE EMBODIMENT'S

The present disclosure will be further described below in conjunction with the drawings and specific embodiments.

Embodiment 1

Figure 1:
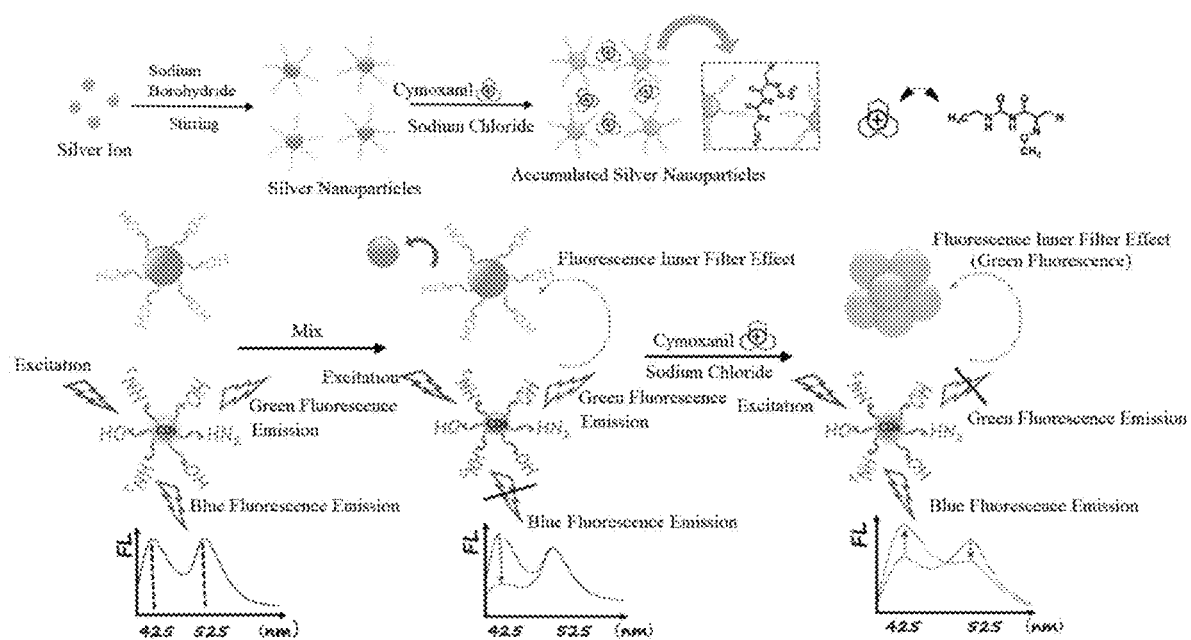
FIG. 1 is a schematic diagram showing preparation for ratiometric fluorescent probe for cymoxanil based on double-emission carbon quantum dot-silver nanoparticle complex and detection principle of the ratiometric fluorescent probe for cymoxanil according to the present disclosure.

This embodiment relates to preparation of a ratiometric fluorescent probe for cymoxanil based on the double-emission carbon quantum dot-silver nanoparticle complex and detection for the ratiometric fluorescent signal of cymoxanil. The preparation process and the principle of the ratiometric fluorescent probe are shown in FIG. 1, and the specific process steps are as follows.

Preparation of silver nanoparticles: 100 mmol/L of silver nitrate solution, 250 mmol/L of trisodium citrate solution and 5 mmol/L of sodium borohydride solution are prepared, the resulting silver nitrate solution and trisodium citrate solution are added to 100 mL of double-distilled water, under magnetic stirring, 1 mL of sodium borohydride solution is added, and then a reaction is performed under stirring for 30 minutes to obtain a yellow solution. The yellow solution is centrifuged, washed by ethanol and vacuum dried at the low temperature to obtain the silver nanoparticles, and the prepared silver nanoparticles are stored in a dark place at 4° C. for use in subsequent experiments.

Preparation of carbon quantum dots: 54.5 mg of 3-aminophenol and 32.0 mg of oxalic acid are added to 50 mL of double-distilled water, and stirred magnetically to mix well, and then heating and reaction are carried out in the water bath to obtain the clear homogeneous mixture. The homogeneous mixture is transferred to the high-pressure reactor and heated at 180° C. for 12 hours. After the end of the reaction, the product solution is cooled to the room temperature and filtered by a 0.22 μm filter membrane to remove large particle impurities. The filtrate is subjected to rotary evaporation to remove water, washed by acetone and ethanol alternately for two times, and then freeze-dried until the water is completely removed. The resulting carbon quantum dot powder is stored at the room temperature for further use.

The resulting silver nanoparticles with the average size of 5 nm are formulated into a silver nanoparticle aqueous solution for reacting at the room temperature and under slow magnetic stirring for 10 minutes to form the homogeneous silver nanoparticle solution. The resulting carbon quantum dots with the average size of 2 nm are formulated into the carbon quantum dot aqueous solution, and the silver nanoparticle solution is added at the room temperature and under the slow magnetic stirring to obtain the carbon quantum dot solutions having the different concentrations of silver nanoparticles, and then the homogeneous solution is obtained after reacting under magnetic stirring for 20 minutes. Fluorescent emission spectra of carbon quantum dots corresponding to different concentrations of silver nanoparticles are measured respectively, and the linear relationship between the intensity ratio of two fluorescent emission peaks of carbon quantum dots and the concentration of silver nanoparticles is fitted, wherein the mass concentrations of silver nanoparticles and carbon quantum dots are 0.1-0.5 µg/mL and 0.01-0.1 µg/mL, respectively.

Figure 2:
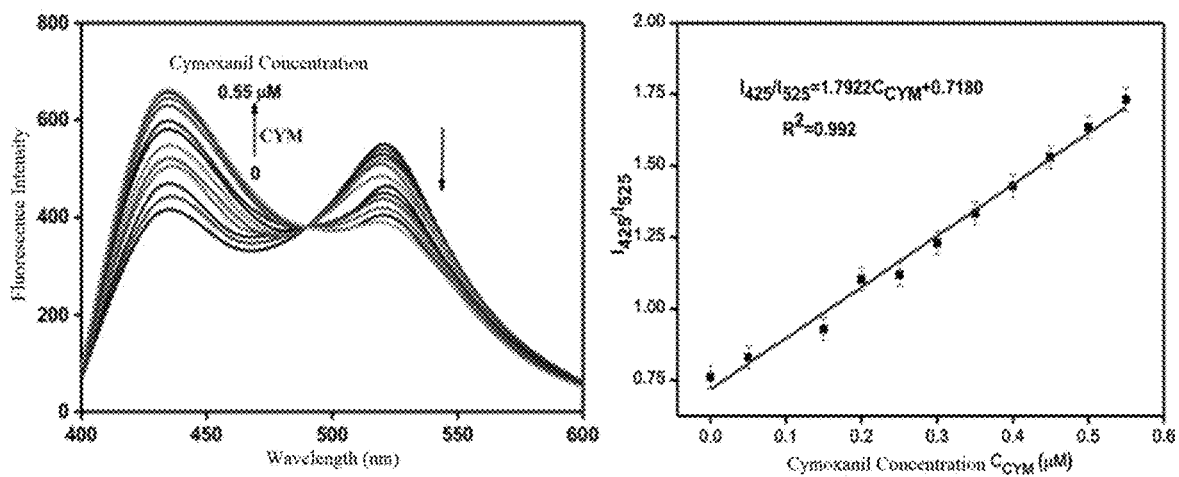
FIG. 2 is a graph showing the response of a ratiometric fluorescent probe for cymoxanil to intensities of two fluorescent emission peaks of double-emission carbon quantum dots as the molar concentration of cymoxanil increases according to the present disclosure.

Cymoxanil is added to the resulting carbon quantum dot aqueous solution containing silver nanoparticles for reacting under magnetic stirring for 20 minutes to form the homogeneous solution. Fluorescent emission spectra of carbon quantum dots in the homogeneous solution corresponding to different molar concentrations of cymoxanil are measured, and linear relationship between the intensity ratio of two fluorescent emission peaks of carbon quantum dots and the molar concentration of cymoxanil is fitted, and the ratiometric fluorescent probe for cymoxanil is constructed. Fluorescent emission spectra of carbon quantum dots corresponding to different molar concentrations of cymoxanil are measured, and linear relationship between the intensity ratios $I_{425}/I_{525}$ of two fluorescent emission peaks and the concentration $C_{CYM}$ of cymoxanil is fitted (see FIG. 2), that is $I_{425}/I_{525}=0.7180+1.7922C_{CYM}$ ($R^2=0.9920$), wherein the concentration range of cymoxanil is 0.05-0.50 µmol/L, and the detection limit of cymoxanil is 0.02 µmol/L.

Embodiment 2

The specific process steps for preparing the silver nanoparticles and the carbon quantum dots in this embodiment are the same as those in embodiment 1, wherein the amounts of the added silver nitrate and trisodium citrate in volume are increased compared with embodiment 1. The resulting silver nanoparticles with the average size of 10 nm are formulated into the silver nanoparticle aqueous solution for reacting at the room temperature and under slow magnetic stirring for 10 minutes to form the homogeneous silver nanoparticle solution. The resulting carbon quantum dots with the average size of 5 nm are formulated into the carbon quantum dot aqueous solution, and the silver nanoparticle solution is added at the room temperature and under the slow magnetic stirring to obtain the carbon quantum dot solutions having the different concentrations of silver nanoparticles, and then the homogeneous solution is obtained after reacting under magnetic stirring for 20 minutes. Fluorescent emission spectra of carbon quantum dots corresponding to different concentrations of silver nanoparticles are measured respectively, and linear relationship between the intensity ratio of two fluorescent emission peaks of carbon quantum dots and the concentration of silver nanoparticles is fitted, wherein the mass concentrations of silver nanoparticles and carbon quantum dots are 0.2-0.8 µg/mL and 0.02-0.2 µg/mL, respectively. Cymoxanil is added to the resulting carbon quantum dot aqueous solution containing silver nanoparticles for reacting under magnetic stirring for 20 minutes to form the homogeneous solution. Fluorescent emission spectra of carbon quantum dots in the homogeneous solution corresponding to different molar concentrations of cymoxanil are measured, and linear relationship between the intensity ratio of two fluorescent emission peaks of carbon quantum dots and the molar concentration of cymoxanil is fitted, and the ratiometric fluorescent probe for cymoxanil is constructed, Fluorescent emission spectra of carbon quantum dots corresponding to different molar concentrations of cymoxanil are measured, and linear relationship between the intensity ratio $I_{425}/I_{525}$ of two fluorescent emission peaks and the concentration $C_{CYM}$ of cymoxanil is fitted, wherein the concentration range of cymoxanil is 0.02-0.50 µmol/L, and the detection limit of cymoxanil is 0.01 µmol/L.

Embodiment 3

The specific process steps for preparing the silver nanoparticles and the carbon quantum dots in this embodiment are the same as those in embodiment 1, wherein the amounts of the added silver nitrate and trisodium citrate in volume are increased compared with embodiment 1. The resulting silver nanoparticles with the average size of 15 nm are formulated into the silver nanoparticle aqueous solution for reacting at the room temperature and under the slow magnetic stirring for 10 minutes to form the homogeneous silver nanoparticle solution. The resulting carbon quantum dots with the average size of 8 nm are formulated into the carbon quantum dot aqueous solution, and the silver nanoparticle solution is added at the room temperature and under the slow magnetic stirring to obtain the carbon quantum dot solutions having the different concentrations of silver nanoparticles, and then the homogeneous solution is obtained after reacting under magnetic stirring for 20 minutes. The fluorescent emission spectra of carbon quantum dots corresponding to different concentrations of silver nanoparticles are measured respectively, and linear relationship between the intensity ratio of two fluorescent emission peaks of carbon quantum dots and the concentration of silver nanoparticles is fitted, wherein the mass concentrations of silver nanoparticles and carbon quantum dots are 0.5-1.0 µg/mL and 0.05-0.2 µg/mL, respectively, Cymoxanil is added to the resulting carbon quantum dot aqueous solution containing silver nanoparticles for reacting under magnetic stirring for 20 minutes to form the homogeneous solution. Fluorescent emission spectra of carbon quantum dots in the homogeneous solution corresponding to different molar concentrations of cymoxanil are measured, and linear relationship between the intensity ratio of two fluorescent emission peaks of carbon quantum dots and the molar concentration of cymoxanil is fitted, and the ratiometric fluorescent probe for cymoxanil is constructed. Fluorescent emission spectra of carbon quantum dots corresponding to different molar concentrations of cymoxanil are measured, and linear relationship between the intensity ratio $I_{425}/I_{525}$ of two fluorescent emission peaks and the concentrations $C_{CYM}$ of cymoxanil is fitted, wherein the concentration range of cymoxanil is 0.05-1.0 µmol/L, and the detection limit of cymoxanil is 0.05 µmol/L.

What is claimed is:
1. A method for preparing a ratiometric fluorescent probe for cymoxanil based on a double-emission carbon quantum dot-silver nanoparticle complex, comprising the following steps:

(1) preparation of silver nanoparticles: preparing 100 mmol/L of silver nitrate solution, 250 mmol/L of trisodium citrate solution and 5 mmol/L of sodium borohydride solution, adding the prepared silver nitrate solution and trisodium citrate solution to 100 mL of double-distilled water, under a magnetic stirring, adding 1 mL of sodium borohydride solution, and then reacting under a stirring for 30 minutes to obtain a yellow solution; wherein the yellow solution is centrifuged, washed by ethanol and vacuum dried at a low temperature to obtain the silver nanoparticles, and the prepared silver nanoparticles are stored in a dark place at 4° C. for use in subsequent experiments;

(2) preparation of carbon quantum dots: adding 54.5 mg of 3-aminophenol and 32.0 mg of oxalic acid to 50 mL of double-distilled water, stirring magnetically to mix well, and then heating and reacting in a water bath to obtain a clear homogeneous mixture; transferring the homogeneous mixture to a high-pressure reactor and heating at 180° C. for 12 hours; wherein after an end of a reaction, a product solution is cooled to room temperature and filtered by a 0.22 μm filter membrane to remove large particle impurities; a filtrate is subjected to a rotary evaporation to remove water, washed by acetone and ethanol alternately for two times, and then freeze-dried until the water is completely removed, and a prepared carbon quantum dot powder is stored at room temperature for further use;

(3) formulating the silver nanoparticles prepared in step (1) into a silver nanoparticle aqueous solution for reacting at room temperature and under slow magnetic stirring for 10 minutes to form a homogeneous silver nanoparticle solution;

(4) formulating the carbon quantum dots prepared in step (2) into a carbon quantum dot aqueous solution, and adding the silver nanoparticle solution at room temperature and under the slow magnetic stirring to form carbon quantum dot solutions containing different concentrations of silver nanoparticles, and then reacting under the magnetic stirring for 20 minutes to obtain a homogeneous solution; wherein fluorescent emission spectra of carbon quantum dots corresponding to different concentrations of silver nanoparticles are measured respectively, and a linear relationship between an intensity ratio of two fluorescent emission peaks of carbon quantum dots and the concentration of silver nanoparticles is fitted;

(5) adding cymoxanil to the carbon quantum dot aqueous solution containing silver nanoparticles prepared in step (4) for reacting under the magnetic stirring for 20 minutes to form a homogeneous solution; wherein fluorescent emission spectra of carbon quantum dots in the homogeneous solution corresponding to different molar concentrations of cymoxanil are measured, and a linear relationship between the intensity ratio of two fluorescent emission peaks of carbon quantum dots and the molar concentration of cymoxanil is fitted, and the ratiometric fluorescent probe for cymoxanil is constructed.

2. The method of claim 1, wherein, in step (1), a size of the silver nanoparticles is 5-20 nm, an amount of the silver nitrate is 100-500 μL, and an amount of the trisodium citrate is 100-500 μL.

3. The method of claim 1, wherein, in step (2), a size of the carbon quantum dots is 1-10 nm.

4. The method of claim 1, wherein, in step (3), a mass concentration of the silver nanoparticles is 0.1-1.0 μg/mL.

5. The method of claim 1, wherein, in step (4), a mass concentration of the carbon quantum dot aqueous solution is 0.1-1.0 μg/mL, a mass concentration of the silver nanoparticles is 0.01-0.2 μg/mL, a mass concentration ratio of the carbon quantum dots to the silver nanoparticles is 1:5-5:1.

6. The method of claim 1, wherein, in step (5), a mass concentration ratio of the carbon quantum dot aqueous solution containing the silver nanoparticles to the cymoxanil is 1:5-5:1, a linear detection range of the molar concentration of cymoxanil is 0.01-1.0 μmol/L, and a detection of the molar concentration of cymoxanil is 0.01-0.5 μmol/L.

* * * * *